United States Patent [19]
Reinhardt et al.

[11] 4,070,914
[45] Jan. 31, 1978

[54] HYDRAULIC CLUTCH-CONTROLLED TRANSMISSION GEAR DETENT SYSTEM

[76] Inventors: Jack Reinhardt; Kenneth Albert Moehle; Jerald Dietrich Hinke, all of Racine, Wis.

[21] Appl. No.: 724,337
[22] Filed: Sept. 17, 1976
[51] Int. Cl.² .............................................. G05G 9/00
[52] U.S. Cl. ...................................... 74/475; 74/527; 74/539; 60/494
[58] Field of Search ................. 74/475, 495, 527, 539; 60/494; 91/51; 192/14 R, 87.18; 251/94

[56] References Cited
U.S. PATENT DOCUMENTS

| | | | |
|---|---|---|---|
| 1,519,172 | 12/1924 | Stewart | 74/495 X |
| 2,903,904 | 9/1959 | Mackie | 74/539 X |
| 3,099,135 | 7/1963 | Hoadley | 60/494 X |
| 3,479,900 | 11/1969 | Mays | 74/475 X |

*Primary Examiner*—Edgar W. Geoghegan
*Attorney, Agent, or Firm*—Arthur J. Hansmann

[57] ABSTRACT

A hydraulic clutch-controlled transmission gear detent system including a gear shiftably mounted on a shift rail and a detent member interposed between the rail and the gear for holding the gear in a shifted position. A hydraulic system, including a valve and a valve controller, such as a clutch pedal, are associated with the detent member to hold the detent member in securing position relative to the shifted gear.

8 Claims, 3 Drawing Figures

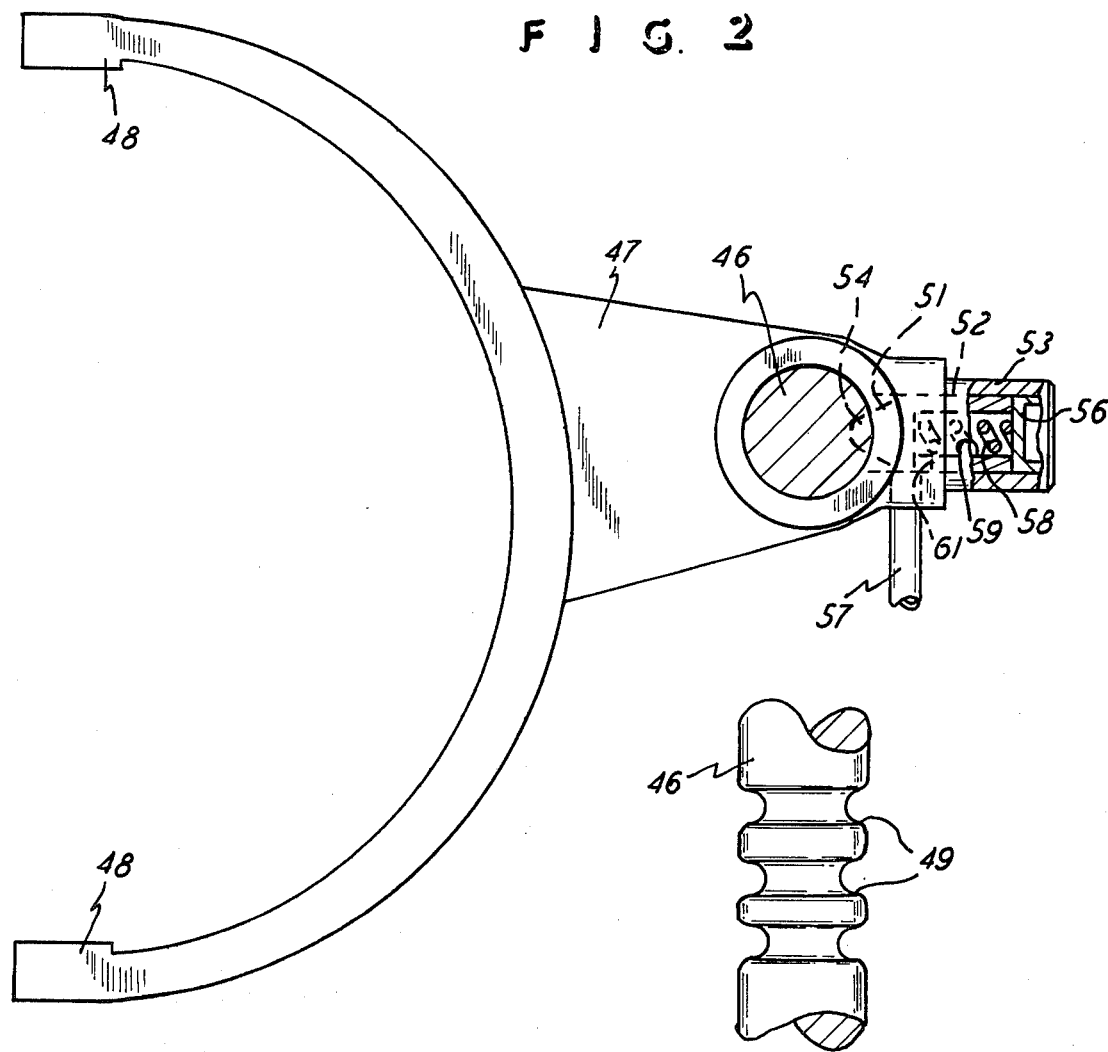

HYDRAULIC CLUTCH-CONTROLLED TRANSMISSION GEAR DETENT SYSTEM

This invention relates to a hydraulic clutch-controlled transmission gear detent system, and, more particularly, it relates to a system wherein the shiftable gears in the transmission are held by means of a spring and also by means of a hydraulic system which is controllable in its pressure for selectively securing the gears in set position.

BACKGROUND OF THE INVENTION

The prior art is already aware of various and sundry detent arrangements where a detent member is under the influence of a spring and/or also hydraulic pressure. Isolated examples of this are seen in U.S. Pat. Nos. 2,451,730 and 3,602,245. In the first said patent, a detent means is disclosed as including a shiftable spool having notches therein and a detent member operative in the notches and being under the influence of a spring and also hydraulic pressure. The second said patent also shows a hydraulic spool with the end of the spool being under the influence of a ball type of detent member which is yieldably secured by means of a spring.

Further examples of some form of prior art are found in U.S. Pat. Nos. 3,869,107 and 3,972,264, which have the same drawing disclosure. These two patents show a detent mechanism which is hydraulically actuated whereby the hydraulic system is operative on the detent mechanism which also serves as a hydraulic piston so that the hydraulic pressure can be applied to the detent member and urge the member into securing position relative to a valve spool. In the aforesaid examples, the disclosures are limited to showing valve spools secured by detent members, and those prior art examples are further limited or at least patentably distinguishable from the present invention in several other respects.

Still further, the prior art is already aware of utilizing a pawl member which is movable into operative position with a gear, for the purpose of controlling a gear type of transmission. However that is solely for the purpose of shifting a pawl for securing a ring gear in a gear transmission, and it is not related to a hydraulically-controlled detent member shiftable for securing a gear in position, according to the present invention.

Accordingly, the present invention provides a hydraulic clutch-controlled transmission gear detent system wherein the hydraulic system is utilized for positioning a detent member to secure the transmission gears in the selected shifted positions. In accomplishing this, the present invention does so by simplified and reliable and readily providable means. Also the system for this invention is practical and can be manufactured and installed and utilized for the purpose of providing a reliable and accurate mechanism for securing shifted gears in position in a transmission.

As such, the present invention provides a hydraulic clutch-controlled transmission gear detent system wherein the gears are shiftable on a shift rail, and a detent member is operatively associated between the shift rail and the shiftable gears, and a hydraulic system is utilized for positioning and securing the detent member in the operative position of holding the shifted gears, and the aforementioned system is utilized in connection with the clutch mechanism for a vehicle or the like wherein the power transmission gears are utilized, all so that upon actuating the clutch, the hydraulic pressure is relieved and the detent member is therefore released and the gears can be shifted. Conversely, when the clutch is not actuated, then the hydraulic pressure is applied to the detent member and the gears are retained in their selected positions.

Other objects and advantages will become apparent upon reading the following description in light of the accompanying drawings.

BRIEF DESCRIPTION OF THE DRAWINGS

FIG. 2 is an end elevational view, with parts thereof broken away, and showing another embodiment of this invention.

FIG. 3 is a view of a fragment of the shift rail shown in FIG. 2.

DETAILED DESCRIPTION OF THE PREFERRED EMBODIMENTS

Figure 1:
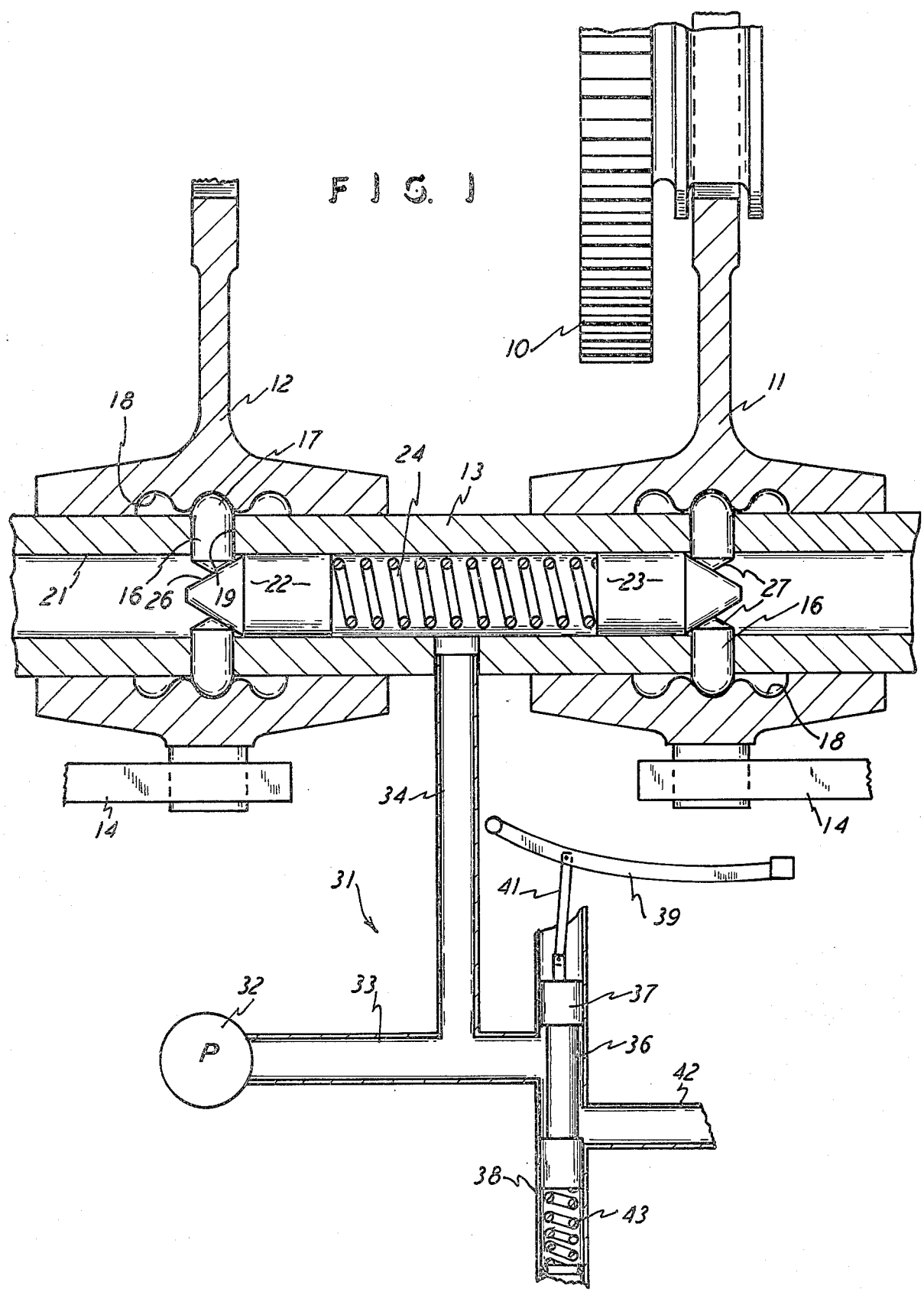
FIG. 1 is a sectional view through one embodiment of this invention.

FIG. 1 shows a fragment of a transmission for a vehicle or the like, and a transmission gear 10 and a shift member 11, which may be in the form of the usual shift fork, such as seen in FIG. 2, engages the gear 10 for shifting the gear along its longitudinal axis, in the usual arrangement. Another shift member 12 is shown in FIG. 1, and it would control still another gear. Therefore, in the usual and well known manner, there is a set of gears, such as the one gear 10, and the gears are shiftable for setting the transmission in the low drive or first or second or third or like gear positions, all as well known and understood by anyone skilled in the art.

The shift rail 13 is included in the transmission and is of a cylindrical shape and pilots the shift forks or members 11 and 12 which therefore slide on the rail 13 in the direction of the longitudinal axis of the rail 13, in the usual arrangement of a vehicle transmission. Also, each fork or shift member 11 and 12 is shown provided with a connector 14 which is only fragmentarily shown and which of course extends to a location which is under the control of the operator who can therefore move the links or connectors 14 for the purpose of sliding the shift members 11 and 12 on the rails 13, in the usual manner of providing the transmission and creating the structure and elements for the shift arrangement described and shown herein. That is, the connectors or links 14 are controlled by the operator who can actuate them and the connectors 14 in turn are suitably connected to the shift members 11 and 12 for sliding those members along the rail 13 and thereby shifting the gears, such as the gear 10, in the transmission or gear set involved, all in the well known and conventional arrangement.

Each of the shift members 11 and 12 is under the control of a detent member 16, and there may be more than one member 16, as shown in FIG. 1, and these members 16 are movably disposed on the shift rail 13 to move radially thereon and into securing position with the shift members 11 and 12. That is, the radially outer ends 27 of the detent members 16 are shown to be hemispherically formed, and they are selectively disposed in one of several hemispherically-formed pockets 18 in the shift members 11 and 12. The pockets 18 are of course spaced along the axis of movement of the members 11 and 12, and thus the detent members 16 can be selectively disposed in any one of the several pockets 18 to thereby hold the shift members 11 and 12 in selected positions, and thus hold the gears 10 in the selected positions. The shift rail 13 therefore has a cylindrical pocket 19 through which the cylindrical detent member 16 can extend and slide radially of the longitudinal axis of the shift rail 13 for movement into and out of engagement with the shift members 11 and 12, and FIG. 1 shows the detent members 16 in the engaged and thus securing position so that the detent members 16 are shown operatively associated with and thus securing the rail 13 with the shift members 11 and 12.

FIG. 1 further shows that the shift rail 13 has a hollow cylindrical interior 21 which snugly slidably receives two spaced-apart piston members 22 and 23, and these members are yieldingly urged apart by a compression spring 24, as shown. The ends 26 of the piston members 22 and 23 are conically shaped, and the inner ends 27 of the detent members 16 are likewise conically shaped, and thus the two conically-shaped configurations are in conformity and sliding contact such that when the piston members 22 and 23 are moved away from each other and into contact with the detent members 16, then the detent members 16 are urged radially outwardly into securing position with the shift members 11 and 12, respectively. Of course it will also be understood that when the piston members 22 and 23 are not sufficiently forced against the detent members 16, then the detent members 16 may slip relative to the shift members 11 and 12 which can therefore be shifted, under the influence of the links 14, and the shifting would of course be along the rail 13, as described above. That is, when only the force of the spring 24 is acting on the piston members 22 and 23 to urge them apart and into contact with the detent members 16, then the shift members 11 and 12 can be moved relative to the shift rail 13 when sufficient force is applied to the shift members 11 and 12 through the connectors 14. However a certain or minimum force is required for moving the shift members 11 and 12 against the holding force of the compression spring 24, but the operator will of course recognize, by a sense of touch through the connectors 14, that the shift members 11 and 12 are in some set position with the detents 16 in one of the recesses 18, though that set position can be overcome with sufficient force applied through the connectors 14, as described and as will be understood by one skilled in the art.

Where a gear set or transmission assembly relies only upon the force of a spring to hold the gears in their desired selected position, it is common to have the gears inadvertently move out of that set position, since the spring holding the detent members is not sufficient for that purpose, and thus the gears do inadvertently shift out of position. The present invention avoids that inadvertent shifting, and it does so by the particular arrangement of the detent members and the pistons described, and it also utilizes a hydraulic system generally designated 31 and shown somewhat schematically in the lower portion of FIG. 1. That is, a hydraulic pump 32 connects with a hydraulic line 33 which has a section 34 extending to the shift rail interior 21 at a location between the pistons 22 and 23, as shown. Accordingly, hydraulic pressure in the line 34, which is in fluid-flow communication with the interior of the shift rail 13, as described, will direct the pressure against the pistons 22 and 23 and cause them to move away from each other and in firm contact with the respective detent member 16 to thereby lock the shift members 11 and 12 in the desired selected position. Of course when there is only a low pressure in the hydraulic line 34, or no pressure at all, then the shift members 11 and 12 are capable of shifting to different positions, as described above, and that action will occur against the force of the spring 24, as mentioned. The hydraulic system 31 includes a valve 36 which controls the hydraulic pressure in the interior 21 of the shift rail 13, and one diagrammatic arrangement for the hydraulic valve 36 is shown. The valve 36 includes a shiftable spool 37 which slides in a cylindrical passageway 38 in the spool housing, and it is shown to be under the control of a clutch member or actuator in the form of a standard vehicle clutch pedal 39. A link 41 connects to the spool 37 for sliding the spool 37 up and down in the valve housing or hydraulic line passageway 38, as shown. As such, the valve 36 controls hydraulic pressure in the line 34, since the valve connects with a hydraulic line passageway 42 which permits the hydraulic fluid to flow from the passageway 33 into the line or housing 38 and thus to the line 42, such as when the spool 37 is in the position shown in FIG. 1, and that is when the clutch pedal 39 is being depressed by the operator, such as through the operator's foot, in the usual manner. That is, when the clutch is actually being operated, such as by depressing the pedal 39, there is a connection to the valve 36 which relieves the pressure of the hydraulic fluid in the shift rail interior 21, and thus hydraulic pressure is relieved on the pistons 22 and 23 and the shift members 11 and 12 can be shifted, all as desired. Conversely, when the pressure on the pedal 39 is released, the spool 37 will return upwardly to a fluid sealing condition relative to the bypass line 42, and such return may be effected by the compression spring 43 which urges the spool 37 upwardly and thus returns the pedal 39 to its upward or inoperative position. When the bypass line 42 is thus closed off, then the pressure from the pump 32 will be directed to the shift rail interior 21 at the location between the pistons 22 and 23 to thereby lock the detent member 16 into engaged position with the shift members 11 and 12, as desired.

FIGS. 2 and 3 show another embodiment of the invention which still utilizes the arrangement of the combination of the detent member operatively associated between a shift rail and the shift members and including the hydraulic system which secures the detent member in the locking position, all as described in connection with FIG. 1. Accordingly, FIG. 2 shows a shift rail 46 on which the shift member 47 is slidably mounted, and it will here be seen that the member is in the nature of a fork having its ends 48 spaced apart and these would of course be on opposite sides of the section of the gears 10, as shown and indicated in connection with FIG. 1. The shift rail 46 is of a solid cylindrical shape, except for the circular grooves 49 extending therein and spaced apart along the axis of the shift rail 46. A detent member 51 is slidably mounted in a cylindrical bore 52 extending in a shank 53 in the shift member or fork 47. Thus, the detent member 51 slides radially toward and radially away from the shift rail 46, and it has a rounded nose or end 54 which engages one of the several grooves 49, when the shift member 47 is adequately aligned with the grooves 49, all for holding the shift member or fork 47 in a position axially on the rail 46 for the gear shifting desired. A plug 56 is shown in the bore 52, and a compression spring 58 is disposed in contact with the detent member 51 to urge the detent member into contact with the shift rail 46 for the minimum force and thus minimum securing of the shift member 47 relative to the shift rail 46, again as described in connection with FIG. 1 also.

Finally, the hydraulic system 31 can also be utilized in FIG. 2, and in this instance a flexible hydraulic line 57, such as of a nylon or rubber tubing, is in hydraulic fluid-flow communication with the shift member 47 to extend to the bore 52 and into the interior 59 of the detent member 51 through a flow passageway 61 in the detent member 51, as seen in FIG. 2. That is, fluid flow in the flexible line 57 is exposed to the passageway 61 in the detent member 51 and thus to the hollow interior 59 of the detent 51. As such, hydraulic pressure in the hollow interior 59 will force the detent member 51 into a secure position holding the shift member 47 axially fixed relative to the rail 46, and such holding position is shown with the detent member nose 54 in FIG. 2. Again, when the operator depresses the clutch pedal 39, and that is when he will want to shift the gears 10, then the hydraulic pressure in the line 57 is relieved and the operator can then move the shift member 47 along the rail 46 and such movement would simply be against the force of the spring 58 which would not prevent the movement but would only make it identifiable and snug and thus permit the operator to know when the shift member 47 has been placed in a gear engaging or shifted position desired.

In summary, both embodiments utilize the force of a compression spring and also hydraulics, with the hydraulics being under the control of the operator and subject to the action of the gear set clutch itself. In these two embodiments, the pistons 22 and 23 are fluid tight in the shift rail hollow interior 21, and also the detent member 51 is fluid tight in the hollow interior 52 of the shift member 47.

What is claimed is:

1. A hydraulic clutch-controlled transmission gear detent system comprising a vehicle, a clutch actuator movably mounted on said vehicle, a transmission shift rail, a shift member slidably mounted on said shift rail for sliding therealong, a connector connected with said shift member for sliding said shift member along said rail, a detent member operatively disposed intermediate said shift rail and said shift member for releasably securing said shift member in position along said shift rail, a hydraulically movable member operatively associated with said detent member for moving said detent member, a gear operatively connected with said shift member for shifting and positioning with respect to the position of said shift member, a hydraulic system operatively associated with said movable member for moving said movable member and thereby move said detent member into operative position relative to said shift rail and said shift member, said hydraulic system including a hydraulic valve for releasing hydraulic pressure in said hydraulic system, and said clutch actuator being connected with said valve for actuating said valve for releasing the hydraulic pressure and thereby releasing said detent member relative to said shift member and said shift rail.

2. The hydraulic clutch-controlled transmission gear detent system as claimed in claim 1, wherein said clutch actuator is a clutch pedal mounted for operation by being depressed by the operator's foot and being connected with said valve and arranged to actuate said valve when said pedal is depressed.

3. The hydraulic clutch-controlled transmission gear detent system as claimed in claim 1, wherein said hydraulic system includes a hydraulic by-pass line in fluid-flow communication with said valve for releasing the hydraulic pressure on said movable member.

4. The hydraulic clutch-controlled transmission gear detent system as claimed in claim 1, including a compression spring operative on said detent member for yieldingly urging said detent member into its operative position relative to said shift member and said shift rail.

5. The hydraulic clutch-controlled transmission gear detent system as claimed in claim 1, wherein said shift rail is hollow, said hydraulically movable member being a hydraulically actuated piston disposed in said shift rail and extending into contact with said detent member for operatively positioning said detent member, said hydraulic system being in fluid-flow communication with the interior of said shift rail for positioning said piston, and a compression spring operative on said piston for yieldingly urging said piston into operative position relative to said detent member.

6. The hydraulic clutch-controlled transmission gear detent system as claimed in claim 5, including two of said shift members and two of said pistons and two of said detent members respectively disposed in separate units, said two pistons being spaced apart in said hollow shift rail, and said hydraulic system including a hydraulic line in fluid-flow communication with said hollow shift rail at a location in the space between said pistons, for fluid-pressure urging said two pistons away from each other in the forcing thereof upon the respective said two detent members.

7. The hydraulic clutch-controlled transmission gear detent system as claimed in claim 5, wherein said piston is slidably fluid-tightly disposed in said hollow shift rail, and said hydraulic system includes a hydraulic line fluid-flow connected with said hollow shift rail at a location to one side of said piston, for fluid-pressure urging said piston toward the other side of said piston.

8. The hydraulic clutch-controlled transmission gear detent system as claimed in claim 5, wherein said hydraulic system includes a hydraulic by-pass line in fluid-flow communication with said valve for releasing the hydraulic pressure on said piston.

* * * * *

UNITED STATES PATENT OFFICE
CERTIFICATE OF CORRECTION

Patent No. 4,070,914    Dated January 31, 1978

Inventor(s) Jack Reinhardt et al.

It is certified that error appears in the above-identified patent and that said Letters Patent are hereby corrected as shown below:

The name of the assignee should be included in the patent as follows:

-- J. I. Case Company, Racine, Wisconsin --.

Signed and Sealed this

Ninth Day of May 1978

[SEAL]

Attest:

RUTH C. MASON
Attesting Officer

LUTRELLE F. PARKER
Acting Commissioner of Patents and Trademarks